(12) United States Patent
Fischer et al.

(10) Patent No.: US 7,850,178 B2
(45) Date of Patent: Dec. 14, 2010

(54) MOTOR VEHICLE ADJUSTABLE TOE LINK

(75) Inventors: Markus Fischer, Ann Arbor, MI (US); Eric Holmes, Ann Arbor, MI (US)

(73) Assignee: ZF Lemforder GmbH, Lemforde (DE)

( * ) Notice: Subject to any disclaimer, the term of this patent is extended or adjusted under 35 U.S.C. 154(b) by 107 days.

(21) Appl. No.: 12/328,252

(22) Filed: Dec. 4, 2008

(65) Prior Publication Data
US 2009/0140506 A1      Jun. 4, 2009

Related U.S. Application Data

(60) Provisional application No. 60/992,176, filed on Dec. 4, 2007.

(51) Int. Cl.
*B60G 7/02* (2006.01)
(52) U.S. Cl. .................................................. 280/86.758
(58) Field of Classification Search ............ 280/86.758, 280/93.51; 403/43, 44, 45, 46, 47, 48; 74/579 R, 74/586
See application file for complete search history.

(56) References Cited

U.S. PATENT DOCUMENTS

| | | | | |
|---|---|---|---|---|
| 3,496,800 A | * | 2/1970 | Brezinski | 74/586 |
| 3,583,052 A | * | 6/1971 | Herbenar et al. | 29/896.7 |
| 4,012,967 A | * | 3/1977 | Warren | 74/586 |
| 4,093,388 A | * | 6/1978 | MacArthur | 403/46 |
| 5,174,677 A | * | 12/1992 | Doolin et al. | 403/24 |
| 5,529,316 A | * | 6/1996 | Mattila | 280/93.51 |
| 5,603,583 A | * | 2/1997 | Jackson | 403/320 |
| 7,182,544 B2 | | 2/2007 | Irrer | |
| 7,185,556 B2 | * | 3/2007 | Beattie | 74/586 |
| 7,201,530 B2 | * | 4/2007 | Wappes et al. | 403/27 |
| 2006/0127166 A1 | * | 6/2006 | Huenink et al. | 403/43 |

FOREIGN PATENT DOCUMENTS

| | | |
|---|---|---|
| KR | 19970028441 | 7/1997 |
| KR | 19970041105 | 7/1997 |
| KR | 20020068591 | 8/2002 |
| KR | 20030031901 | 4/2003 |

* cited by examiner

*Primary Examiner*—Paul N Dickson
*Assistant Examiner*—Robert A Coker
(74) *Attorney, Agent, or Firm*—Gifford, Krass, Sprinkle, Anderson & Citkowski, P.C.

(57) ABSTRACT

A toe link for the suspension system of a vehicle includes means for adjusting the axial length of the toe link while preventing relative rotation of the extending ends of the toe link.

8 Claims, 3 Drawing Sheets

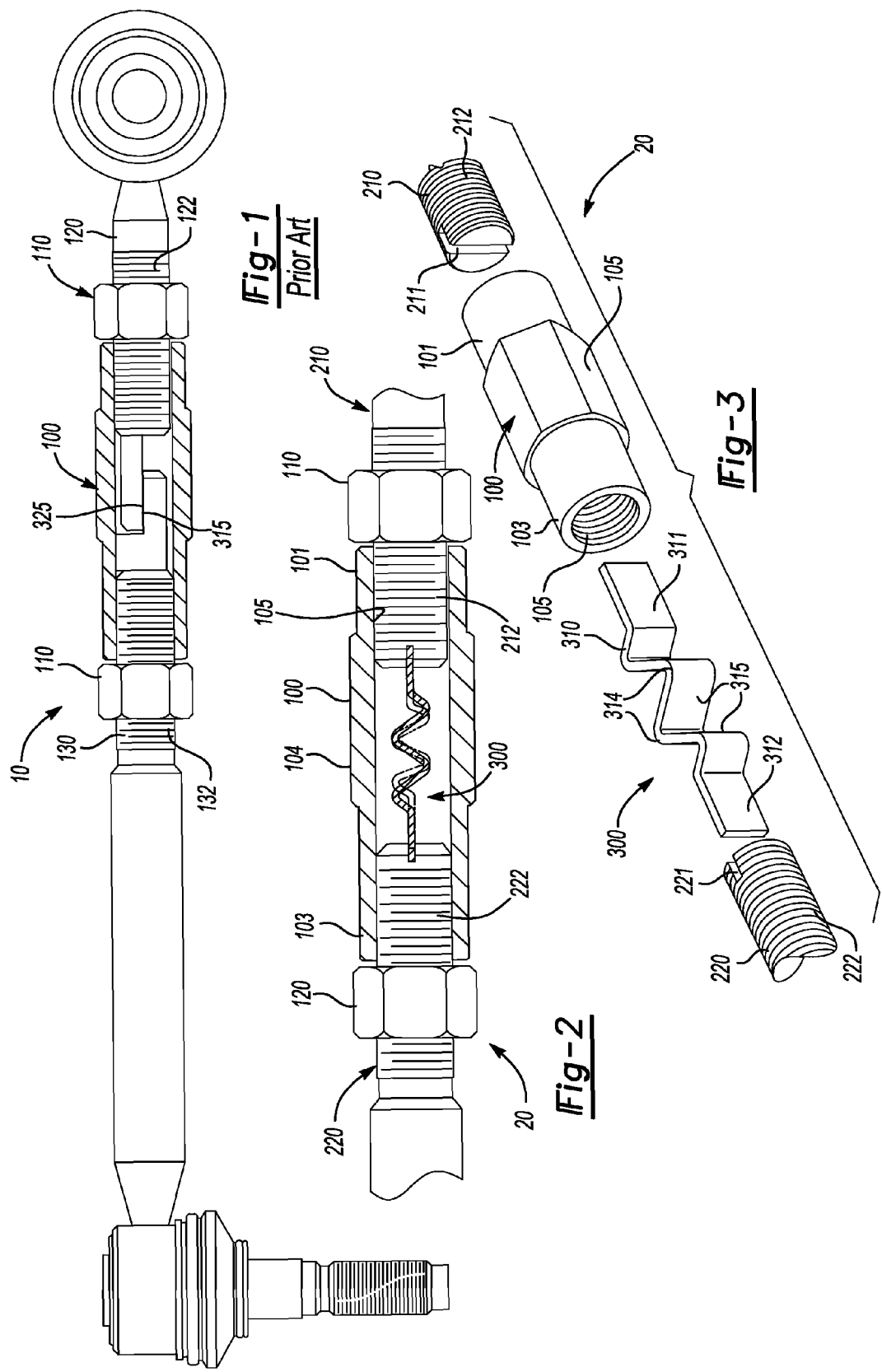

MOTOR VEHICLE ADJUSTABLE TOE LINK

CROSS-REFERENCE TO RELATED APPLICATIONS

This application claims the benefit of U.S. Provisional Application Ser. No. 60/992,176, filed Dec. 4, 2007, which is incorporated herein by reference.

FIELD OF THE INVENTION

The present invention relates to motor vehicle suspension systems and more particularly to an improved toe link for such systems which is capable of being longitudinally adjusted.

BACKGROUND OF THE INVENTION

Suspensions of modern passenger cars have become relatively complex in order to fulfill the safety and performance demands required by customers. This complexity has led to multi-link rear suspension systems with control arms and a toe link. The toe link is typically longitudinally adjustable in order to allow for the compensation within a given tolerance during the final assembly of the suspension system.

Referring to FIG. 1, a prior art adjustable toe link 10 is shown as having a first rod 120 with a machined alignment surface 315 and a second rod 130 with a machined alignment surface 325. These machined aligned surfaces 315 and 325 are located within an adjuster 100 that permits axial movement of the machined alignment surfaces 315 and 325, and thus the rods 120 and 130, relative to one another by using the external threads 122 and 132 of the rods 120 and 130 respectively in combination with internal threads (not shown) of the adjuster 100. The external threads 122 can be either left-hand threads or right-hand threads, with the external threads 132 being opposite to the external threads 122. In this manner, rotation of the adjuster 100 causes the extension or contraction of the overall length of a toe link 10.

In operation, rotation of the adjuster 100 in a first direction results in the screwing of the first rod 120 and the second rod 130 into the adjuster thus shortening the length of the toe link 10. In the alternative, rotation of the adjuster 100 in an opposite second direction results in the unscrewing of the first rod 120 and the second rod 130 from the adjuster 100 causing the toe link 10 to lengthen axially. The machined alignment surfaces 315 and 325 prevent relative rotation of the first rod 120 and the second rod 130 as the adjuster 100 is rotated with one of the rods 120 or 130. In addition, the machined alignment surfaces lessen the load on the distal ends of the first rod 120 and the second rod 130 that attach to the suspension system of the motor vehicle to resist rotation of the toe link. 10.

After the desired overall length of the toe link 10 has been obtained by rotating the adjuster 100 relative to the first rod 120 and the second rod 130, a pair of jamb nuts 110 can be tightened against the adjuster 100 in order to set the toe link 10 at a desired fixed length. In this manner, the toe link 10 can be lengthened and shortened and subsequently fixed at a given length. Although such a toe link adjuster 100 is useful, the requirement of the machined alignment surfaces 315 and 325 increases the complexity and cost of adjustable toe links.

Therefore, an adjustable toe link that can provide adjustment to its overall length while not requiring machined alignment surfaces would be desirable.

SUMMARY OF THE INVENTION

The present invention discloses an adjustable toe link for a motor vehicle. As such, the toe link has utility as a part of a suspension system or a vehicle.

The adjustable toe link disclosed herein includes a first threaded rod, a second threaded rod and an adjuster having a generally hollow cylindrical body with a first end and a second end. The first end of the adjuster has internal threads dimensioned to accept external threads on the first threaded rod and the second end has internal threads dimensioned to accept external threads on the second threaded rod. A generally rigid insert is located between and attached to the end of the first threaded rod and the end of second threaded rod. Located within the generally hollow cylindrical body of the adjuster, the generally rigid insert is located between and inserted at least partially into the end of the first threaded rod and the end of the second threaded rod. The generally rigid insert is operable to prevent the first threaded rod and the second threaded rod from rotating relative to one another when the adjuster is rotated to lengthen or shorten the toe link.

BRIEF DESCRIPTION OF THE DRAWINGS

FIG. 1 is longitudinal view partially in cross-section of an adjustable toe link of the prior art;

FIG. 2 is a view similar to FIG. 1 but illustrating a portion of an adjustable toe link of the present invention;

FIG. 3 is an exploded perspective view of the adjustable toe link shown in FIG. 2;

DETAILED DESCRIPTION OF THE PREFERRED EMBODIMENTS

Figure 4:
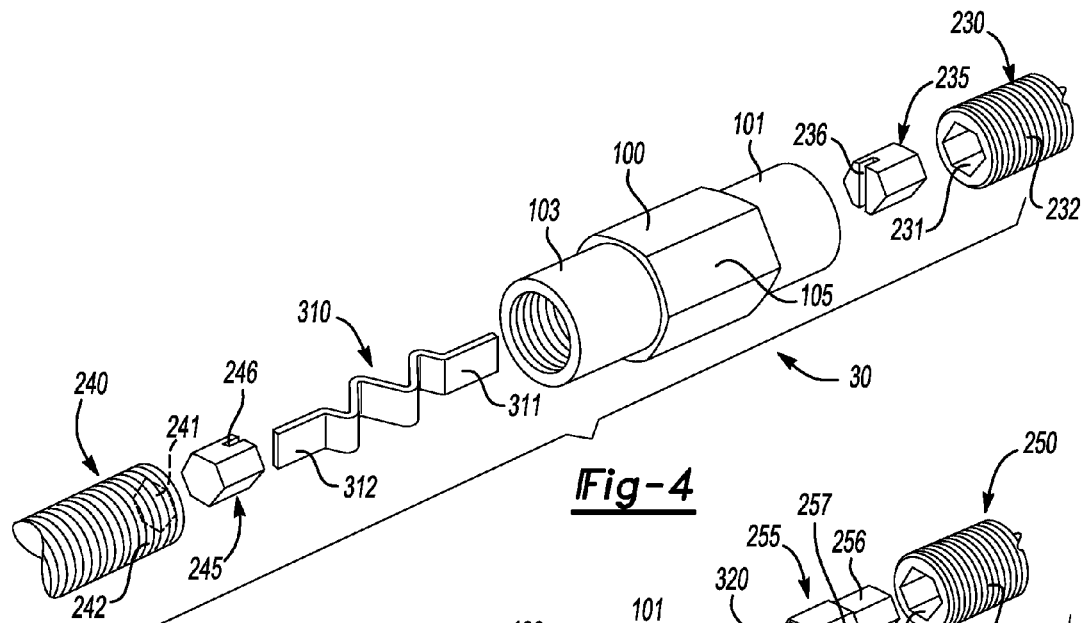
FIG. 4 is an exploded perspective view similar to FIG. 3 but illustrating another adjustable toe link of the present invention.

Turning now to FIGS. 2 and 3, an embodiment of an adjustable toe link is shown generally at reference numeral 20. The toe link 20 includes a first rod 210 and a second rod 220. The first rod 210 is provided with external threads 212 and a slot 211. The second rod 220 is provided with external threads 222 and a slot 221.

The toe link 20 includes an adjuster 100, the adjuster 100 having a generally hollow cylindrical body 104 with a first end 101 and a second end 103. The first end 101 has internal threads 105 that are dimensioned such that the first rod 210 with the external threads 212 can be screwed into the first end 101 of the adjuster 100. Likewise, the second end 103 of the adjuster 100 has internal threads 105 that are dimensioned such that the second rod 220 with the external threads 222 can be screwed there into. In some instances, the external threads 212 of the first rod 210 are left-hand threads and the external threads 222 of the second rod 220 are right-hand threads. In the alternative, the first rod 210 can have external right-hand threads and the second rod 220 can have external left-hand threads.

Located within the generally hollow cylindrical body 104 of the adjuster 100 is a insert 300. As illustrated in FIG. 3, the insert 300 is in the form of a flat spring 310, the spring 310 having a first end 311 and a second end 312. In between the first end 311 and the second end 312, the spring 310 is provided with nonparallel sections 315 adjoined with crowns 314. The first end 311 is dimensioned such that it fits at least partially within the slot 211 of the first rod 210. Likewise, the second end 312 is dimensioned such that at least partially fits within the slot 221 of the second rod 220.

Upon assembly of the toe link 20, the first rod 210 and the second rod 220 are screwed into the adjuster 100 with the insert 300 located within the hollow cylindrical body of the adjuster between the first rod 210 and the second rod 220. In addition, the insert 300 has its first end 311 inserted at least partially within the slot 211 and its second end 312 inserted at least partially within the slot 221. It is appreciated that the spring 310 permits axial movement of the first rod 210 and the second rod 220 toward and away from each other long the toe link 20 while preventing rotational movement of the first rod 210 or second rod 220 when the adjuster 100 is rotated and one of the rods 210 or 220 is held in a fixed rotational position. In this manner, the insert 300 affords for adjustment of the overall length of the toe link 20 while preventing rotation of one of the rods when the other rod is held in a fixed rotational position. It is appreciated that a distal end of the first rod 210 and a distal end of the second rod 220 can be attached to different locations of a motor vehicle suspension system.

Turning now to FIG. 4, another preferred embodiment of the invention is shown generally at reference numeral 30 as including the spring 310 in combination with a first insert 235 and a second insert 245. The toe link adjuster 30 has a first rod 230 with external threads 232 and a cavity 231 at the end of the rod 230. Likewise, a second rod 240 has external threads 242 with a cavity 241 at the end of the rod 240 facing the cavity 231. The cavity 231 and the first insert 235 are dimensioned such that the insert 235 fits at least partially within the cavity 231 and yet does not rotate therein. In addition, the cavity 241 and the second insert 245 are dimensioned such that the insert 245 can fit at least partially within the cavity 241 and not rotate therein. The first insert 235 has a slot 236 and the second insert 245 has a slot 246. The slots 236 and 246 are dimensioned such that the first end 311 and the second end 312 of the spring 310 can fit at least partially therein, respectively. It is appreciated that the external threads 232 and the external threads 242 work in a similar fashion with respect to the adjuster 100 as disclosed above with respect to FIGS. 2 and 3.

Upon assembly, the first rod 230, with the first insert 235 inserted at least partially within the cavity 231, is threaded into the first end 101 of the adjuster 100. Likewise, the second rod 240, with the second insert 245 inserted at least partially within the cavity 241, is threaded into the second end 103 of the adjuster 100. Located within the generally hollow cylindrical body of the adjuster 100 with the second end 311 at least partially inserted within the slot 236 of the first insert 235 and the second end 312 at least partially inserted within the slot 246 of the second insert 245 is the spring 310. Thus as explained for the toe link 20 above, the toe link 30 permits axial movement of the first rod 230 and the second rod 240 with respect to the adjuster 100 while preventing rotational movement of the first rod 230 or the second rod 240 when one of the rods is held in a fixed rotational position. In this manner, the adjuster 100 provides for adjustment of the overall length of the toe link 30 while the distal ends of the toe link 30 are held in a fixed rotational position relative to each other. The spring 310 prevents relative rotation of the rods 230 and 240 while the adjuster is being rotated to adjust the axial link of the toe link 30.

Figure 5:
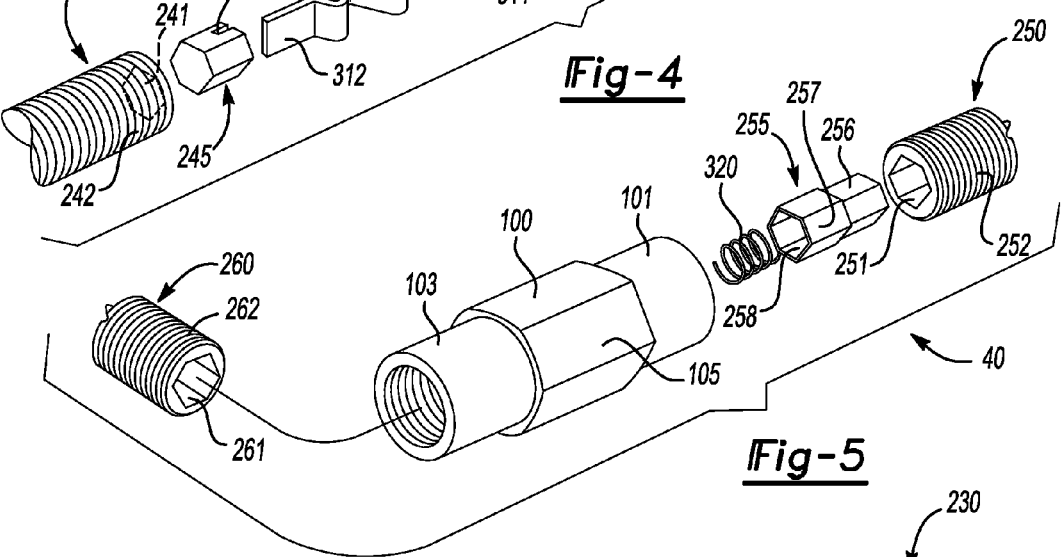
FIG. 5 is an exploded perspective view similar to FIGS. 3 and 4 but illustrating yet another preferred adjustable toe link of the present invention.

Turning now to FIG. 5, another embodiment is shown generally at reference numeral 40. The adjustable toe link 40 includes a first rod 250 with external threads 252 and a cavity 251. Also included is a second rod 260 with external threads 262 and a cavity 261. A single insert 255 is included, the insert 255 having a first end 256 and a second end 257. The first end 256 is dimensioned such that it can fit at least partially within the cavity 251 and not rotate therein. The second end 257 is dimensioned such that it can fit at least partially within the cavity 261 and not rotate therein. A spring 320 is dimensioned to fit at least partially within a cavity 258 within the second end 257 of the insert 255. The spring 320 abuts against the second rod 260 and can apply a force upon the insert 255 such that the first end 256 remains at least partially inserted within the cavity 251 of the first rod 250 while the second end 257 is at least partially within the cavity 261.

Figure 6:
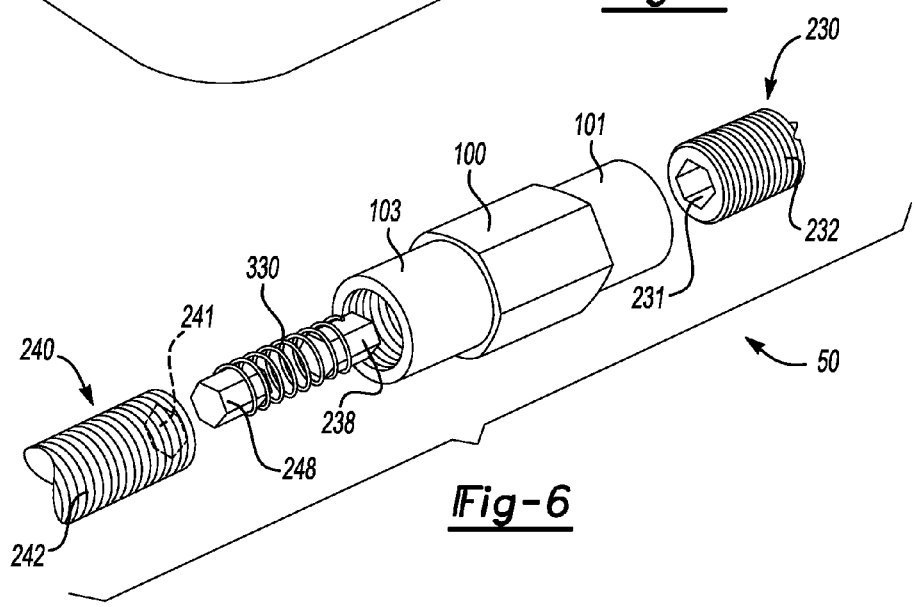
FIG. 6 is an exploded perspective view of still another adjustable toe link of the present invention.

Another embodiment shown generally at reference numeral 50 is illustrated in FIG. 6. This embodiment includes the first rod 230 having external threads 232 and the cavity 231, and the second rod 240 having the external threads 242 and the cavity 241. In contrast to the first insert 235, the second insert 245 and the spring 310 as illustrated in FIG. 4, the toe link 50 includes a first insert 238, a second insert 248 and a spring 330. The first insert 238 is dimensioned such that it fits at least partially within the cavity 231 and yet cannot rotate therein. Likewise the second insert 248 is dimensioned such that it can fit at least partially within the cavity 241 and not rotate therein. Attached to the first insert 238 and the second insert 248 is a spring 330. The spring 330 urges inserts 248 and 238 apart and into the cavities 241 and 238 respectively while permitting axial adjustment of the toe link 50 by the adjuster 100. In this manner, axial movement of the first rod 230 and the second rod 240 with respect to the adjuster 100 is provided while rotational movement of the first rod 230 or the second rod 240 is prevented when one of the rods is held in a fixed rotational position.

Figure 7:
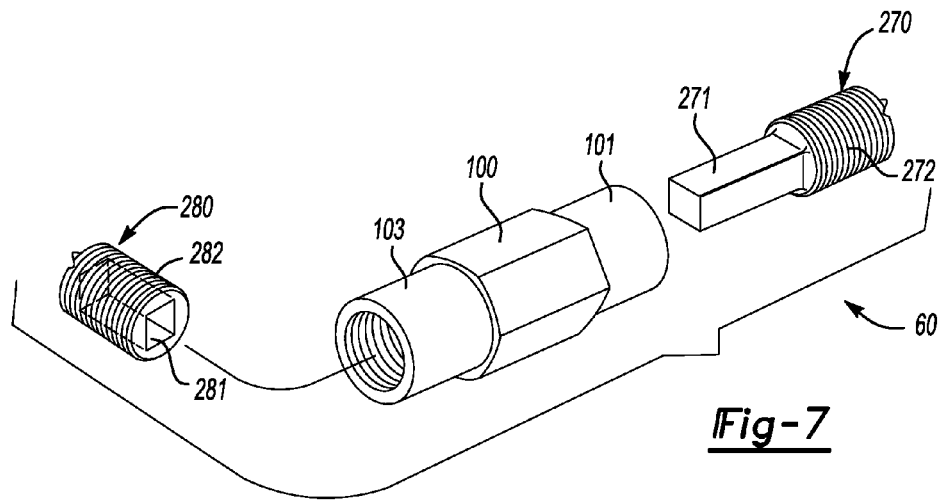
FIG. 7 is another exploded perspective view of another adjustable toe link of the present invention.

Turning now FIG. 7, another embodiment is shown generally at reference numeral 60. The toe link 60 includes a first rod 270 having external threads 272 and a projection 271. In addition, the toe link adjuster 60 includes a second rod 280 having external threads 282 with a cavity 281 dimensioned such that the projection 271 can fit at least partially therein and yet not rotate therein. Upon assembly, the first rod 270 is threaded into the first end 101 of the adjuster 100 and the second rod 280 is threaded into the second end 103. In addition, the projection 271 is located at least partially within the cavity 281. The cavity 281 is deep enough to permit a range of axial movement of the rods 270 and 280 toward and away from each other while still maintaining the projection 271 in the cavity 281. Thus, axial movement of the first rod 270 and the second rod 280 is provided while the projection 271 located at least partially within the cavity 281 prevents rotation of the first rod 270 or the second rod 280 when one of the rods is held in a fixed rotational position. It is appreciated that the projection 271 has a length sufficient to allow desired adjustment in the axial direction of the toe link 60.

Figure 8:
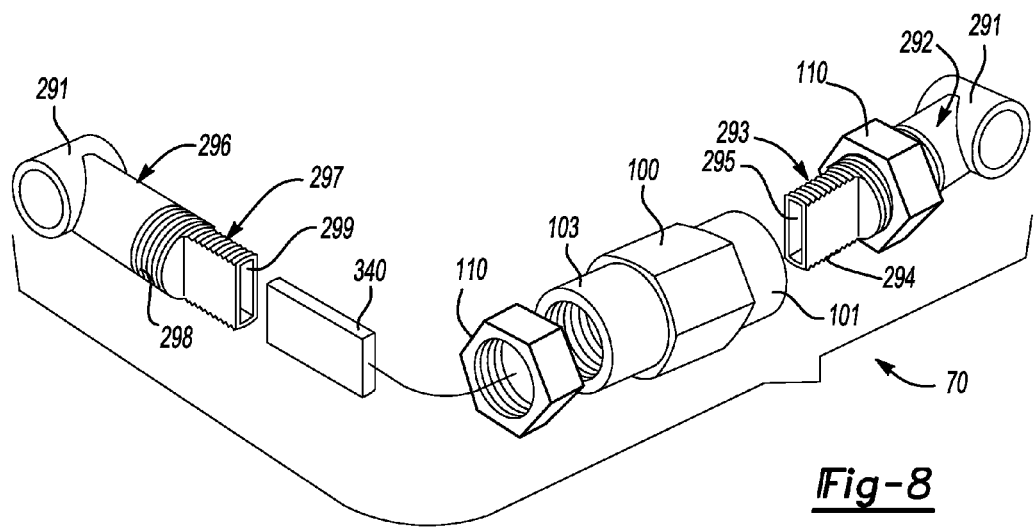
FIG. 8 is yet another exploded perspective view of yet another adjustable toe link of the present invention.
Figure 9:
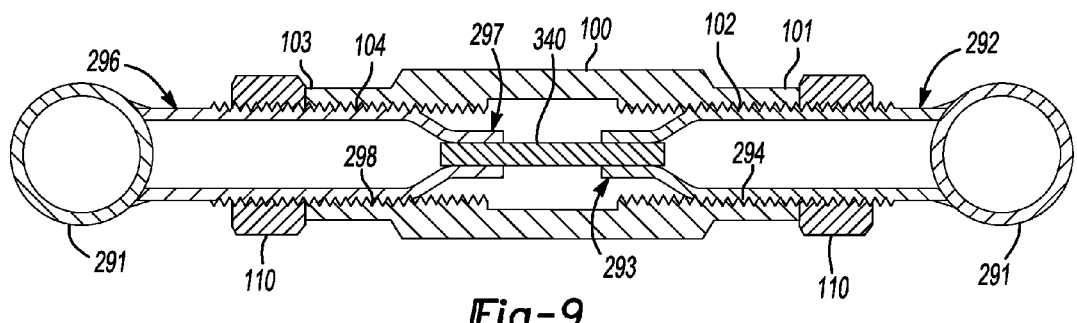
FIG. 9 is a longitudinal cross sectional view of the preferred adjustable toe link shown in FIG. 8.

Turning now to FIGS. 8 and 9, another embodiment is shown generally at reference numeral 70. The toe link 70 has a first tube 292 and a second tube 296. The first tube 292 has external threads 294, a threaded stub 293, and a cavity 295 within the threaded stub 293. Likewise, the second tube 296 has external threads 298 with a threaded stub 297 having a cavity 299 therein. The threaded stub 293 having external threads 294 thereon is dimensioned such that the first tube 292 can be threaded into the first end 101 of the adjuster 100. Likewise, the threaded stub 297 with external threads 298 is dimensioned such that the second tube 296 can be threaded into the second end 103. Also included in the toe link 70 is an insert 340, the insert 340 being dimensioned such that it can fit at least partially within the cavity 295 and the cavity 299. FIG. 9 shows a side cross-sectional view of the embodiment shown in FIG. 8, wherein the internal threads 102 of the first end 101 and the internal threads 104 of the second end 103 are illustrated. Thus as disclosed with the other embodiments, the toe link 70 permits axial movement of the first tube 292 and the second tube 296 relative to the adjuster 100 and to each other while preventing rotation of the first tube 292 or the second tube 296 when one of the tubes is held in a fixed rotational position.

It is appreciated that the first tube 292 and/or the second tube 296 can be manufactured by taking a cylindrical tube, crimping the end over the insert 330, rolling threads onto the crimped end and then forcibly removing the insert 340. In the alternative, the insert 340 can be left within the crimped end of the first tube 292 or the second tube 296. In addition, it is appreciated that the first tube 292 and/or the second tube 296 can be welded to a bushing hoop 291 or any other attachment device that affords for attachment of the toe link adjuster 70 to the suspension system of a motor vehicle. It is also appreciated that the various components of the toe link disclosed herein can be made from any material known to those skilled in the art, illustratively including metals, alloys, plastics, ceramics and the like.

It should be apparent that although the present invention has been described as being useful as a means for adjusting the axial length of a toe link for use in a suspension system of a vehicle the adjustment means disclosed herein has uses beyond such toe links. The invention could be used as well in any connecting member where axial adjustment is important. Further the invention is not restricted to the illustrative examples described above and not intended as limitations on the scope of the invention. Changes therein and other uses will occur to those skilled in the art.

We claim:

1. A longitudinally adjustable link for linking one structure to another comprising:
   a) a first threaded rod and a second threaded rod, said first threaded rod having external left-hand threads and said second threaded rod having external right-hand threads;
   b) an adjuster having a generally hollow cylindrical body with a first end and a second end, said first end and said second end having internal threads dimensioned to accept said first threaded rod and said second threaded rod, respectively;
   said adjuster having said first threaded rod and said second threaded rod at least partially threaded there into whereby rotation of said rod causes said rods to move toward each other to move away from each other to axially lengthen or axially shorten said link;
   an insert positioned within said generally hollow cylindrical body of said adjuster and disposed between and inserted at least partially into said first threaded end and said second threaded end, and operable to permit relative axial movement of said rods while preventing relative rotation between said first threaded rod and said second threaded rod when said adjuster is rotated.

2. The link as defined in claim 1 and which said insert comprises a spring joining the ends of said rods to permit said rods to move axially toward and away from each other but preventing relative rotation between said rods as said adjuster is rotated on said rods.

3. The link as defined in claim 2 and in which;
   a) each of said ends of said rods having a cavity; and
   b) said spring having opposite ends extending into said cavities respectively and being dimensioned to prevent relative rotation between said rods.

4. The link as defined in claim 1 and in which;
   a) each of said ends of said rods having a cavity; and
   b) said insert extending axially between said ends of said rods with end portions extending into said cavities; and
   said insert and said cavities being operable to prevent relative rotation of said rods when said insert is positioned in said cavities.

5. The link as defined in claim 4 and in which said cavities are sufficiently deep to receive said ends of said insert over a range of axial movement of said rods toward and away from each other.

6. An adjustable toe link for a motor vehicle, said toe link comprising:
   a first threaded rod with a first end having a cavity and a second threaded rod with a second end having a cavity;
   an adjuster having a generally hollow cylindrical body with a first end and a second end; said first end and said second end having internal threads dimensioned to accept said first threaded rod and said second threaded rod to permit axial spacing of said rods upon threading of said rods into and outwardly in said adjuster;
   an insert comprised of a spring disposed between and attached to said first end and said second end of said rods, said insert being operable to permit said rods to move axially toward and away from each other but preventing rotation of said rods with respect to each other when said adjuster is rotated with respect to said rods; said spring having opposite ends extending into said cavities respectively and being dimensioned to prevent relative rotation between said rods.

7. The toe link as defined in claim 6 and in which;
   a. said insert extending axially between said ends of said rods with end portions extending into said cavities; and
   b. said insert and said cavities being operable to prevent relative rotation of said rods when said insert is positioned in said cavities.

8. The toe link as defined in claim 7 and in which said cavities are sufficiently deep to receive said ends of said insert over a range of axial movement of said rods toward and away from each other.

* * * * *